Jan. 8, 1929.  1,698,399
C. B. FUNK
POWER TRANSMISSION MEANS
Filed Dec. 2, 1924   3 Sheets-Sheet 1
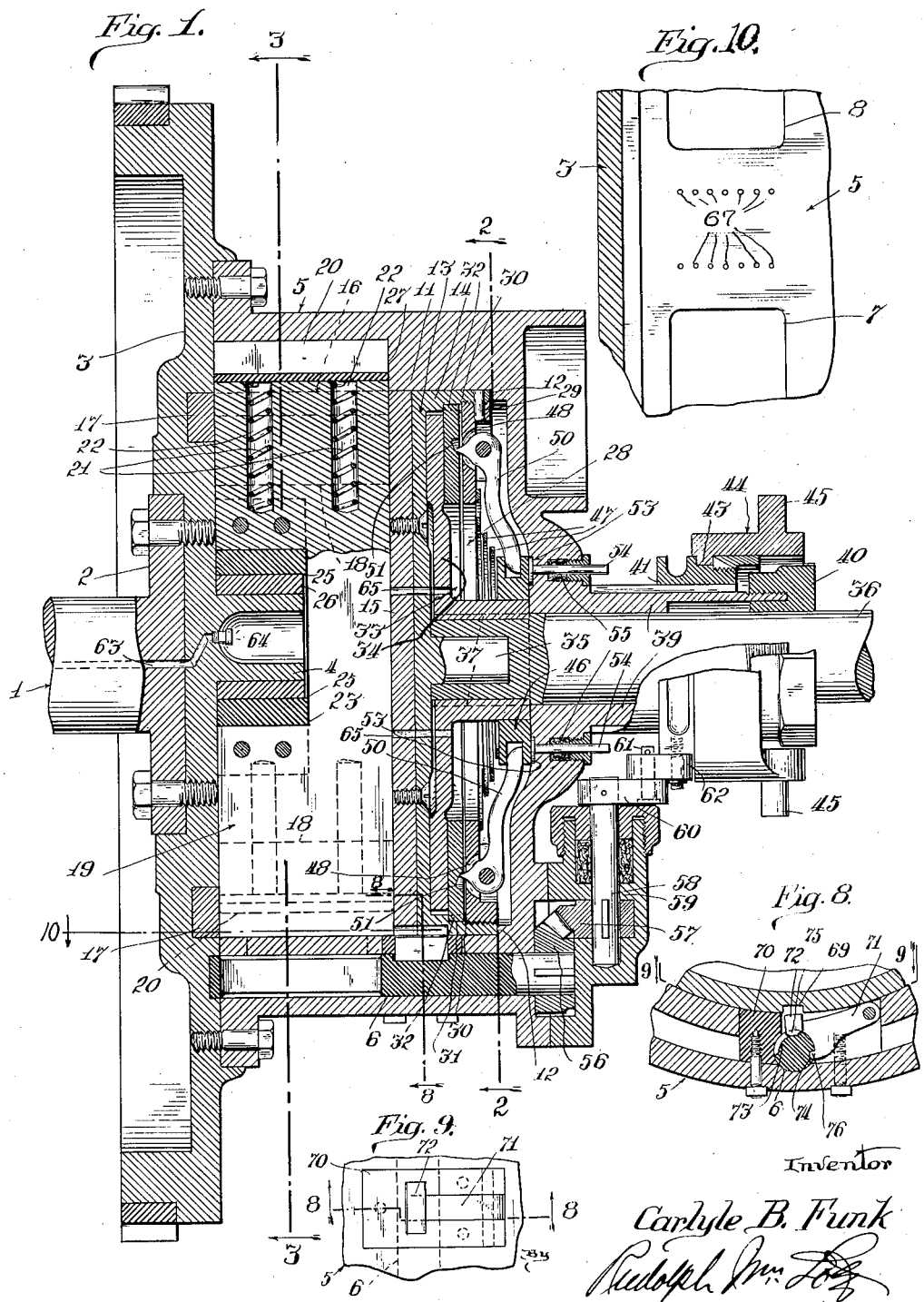
Inventor
Carlyle B. Funk
Attorney.

Jan. 8, 1929.
C. B. FUNK
1,698,399
POWER TRANSMISSION MEANS
Filed Dec. 2, 1924      3 Sheets-Sheet 2
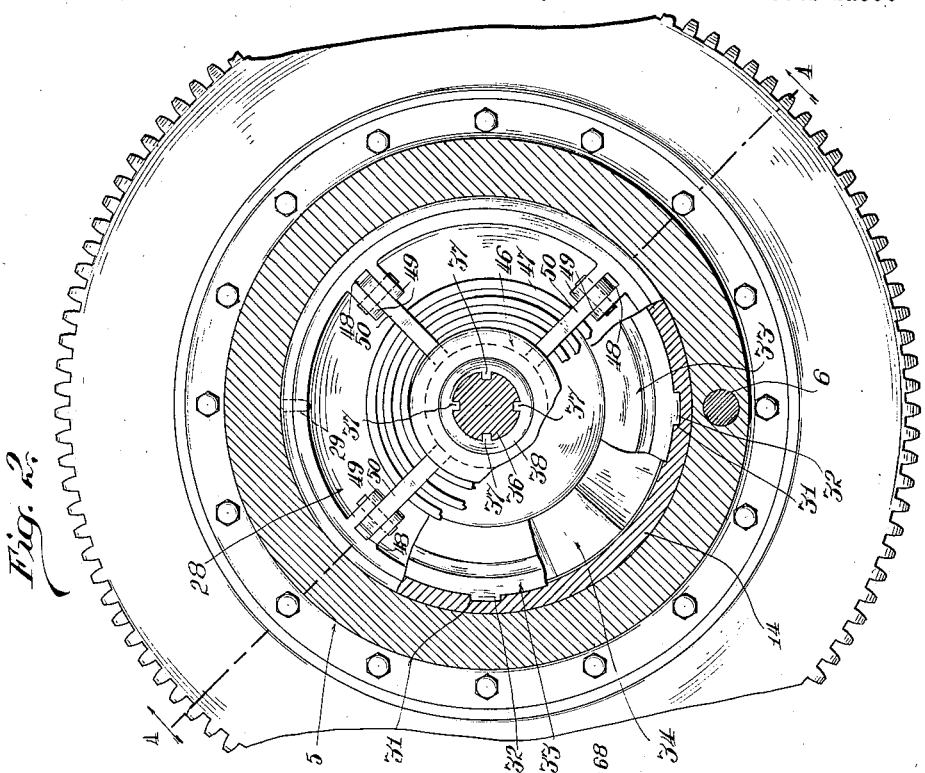
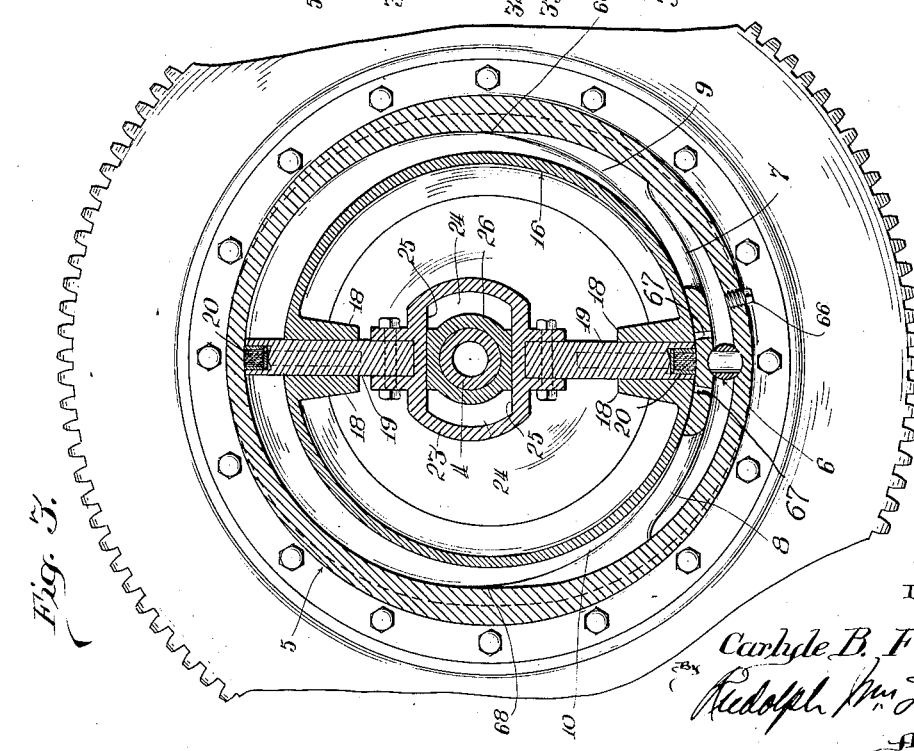
Inventor
Carlyle B. Funk
By Rudolph M. Lotz
Attorney

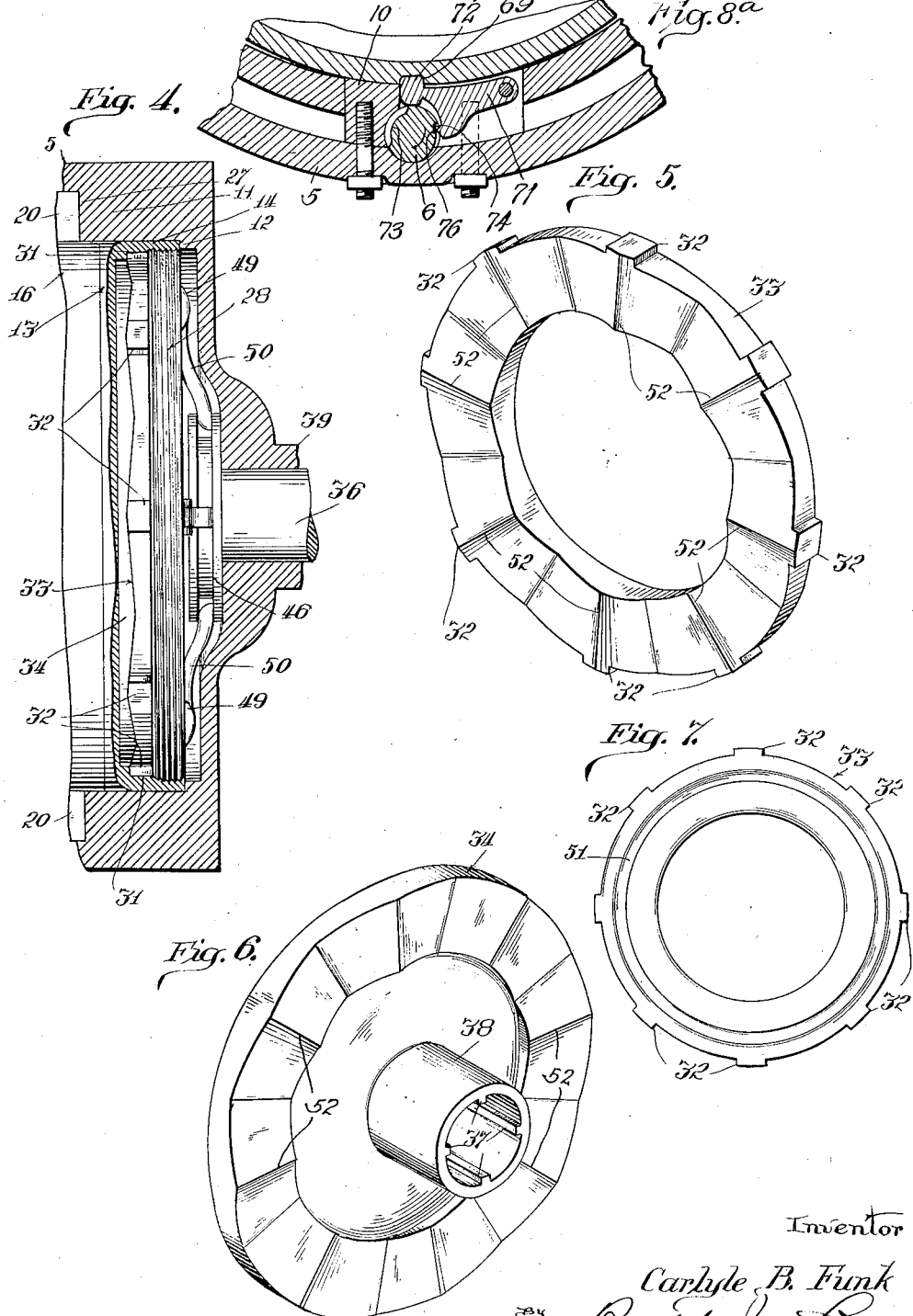

Patented Jan. 8, 1929.

1,698,399

UNITED STATES PATENT OFFICE.

CARLYLE B. FUNK, OF CHICAGO, ILLINOIS.

POWER-TRANSMISSION MEANS.

Application filed December 2, 1924. Serial No. 753,445.

This invention relates to improvements in power transmission mechanism and more particularly to that type employing fluid-pressure means for transmitting motion from a driving element to an element to be driven.

The invention relates most directly to so-called "hydraulic" clutches wherein the power transmitting element consists of a trapped, partially trapped, or completely released fluid and which, in the released condition, has substantially unrestricted circulation to thereby prevent power transmission from the driving to the driven member.

The main object of the present invention is to provide so-called hydraulic or fluid-pressure power transmitting means or mechanism, wherein the fluid and the elements normally effecting circulation thereof may, when it is so desired, be released from the driven shaft so as to completely dissociate the driving and driven elements, so that the members of the hydraulic means are maintained wholly at rest in relation to each other and come into operation only when it is desired to transmit part or all of the power or motion of the driving to the driven element.

The foregoing object may further be expressed in terms of "clutch-drag", which is a condition of incomplete power release common to all clutches, and which results in this device, for example, during periods of as complete fluid pressure release with respect to the driving and driven elements as is possible, and which "clutch drag" is augmented and becomes particularly objectionable in this class of transmission devices, during periods of idling in gear, because of frictional contact of working surfaces within the fluid pressure chamber, it being a further object of the invention to reduce the resultant wear on said surfaces and thus materially increase the life of the device.

The main object of the invention, as above stated, further comprehends an absolute and complete release of connection or association between the driven element and an operative part of the fluid-pressure clutch while idling in gear and an absolute and complete lock-association between them for purposes of transmission of any part, or all of the power.

The complete dissociation of the driving from the driven element is very desirable, particularly in the application of the clutch to automotive vehicles, for many reasons, as, for example:

1. To relieve the engine and transmission line of all clutch-drag load when idling in gear.
2. To eliminate opposition to changing gears.
3. To eliminate all resistance to coasting.
4. To reduce wear in the clutch.

A further object of the invention is to arrange the parts so that the locking of the driving and driven parts of the coupler device may be accomplished by spring action which completes the lock, even after operation by the driver is finished.

A further object of the invention is to arrange the parts so that the engaging members of the coupler device may be small in size, and light in weight to obviate momentum spin, be of polished steel to provide strength and reduce friction of contacting parts when idling and be adjustable to compensate for wear.

The present invention is particularly adapted to include the specific construction of hydraulic or fluid-pressure clutch disclosed in and by Letters Patent of the United States, No. 1,411,485, granted to me on the 4th day of April, 1922, and in and by my pending application for patent, Serial No. 346,561, filed Dec. 18, 1919, but may be equally advantageously, constructed or adapted to include or be associated with other types and kinds of fluid-pressure clutches or the like, without departure from the invention as defined in the appended claims, it being obvious that the means for effecting primary association of the driven element with an operative element of the fluid-pressure clutch are also selective within the definition of the said claims.

A suitable embodiment of the invention is illustrated in the accompanying drawings, wherein:

Fig. 1 is a central longitudinal section of a power transmission mechanism constructed in accordance with the invention.

Figs. 2 and 3 are transverse sections of the same on the lines 2—2 and 3—3, respectively, of Fig. 1.

Fig. 4 is a fragmentary section of the same on the line 4—4 of Fig. 2.

Figs. 5 and 6 are detail perspective views of the two members of the coupler for effecting association of a shaft with a member or element of the fluid-pressure clutch.

Fig. 7 is a view in elevation of one of said coupler elements.

Fig. 8 is a fragmentary detail section on the lines 8—8 of Figs. 1 and 9, illustrating means for automatically locking the rotor of the fluid-pressure transmission element with the casing thereof.

Fig. 8a is a view similar to Fig. 8, showing the parts in a different or locking position.

Fig. 9 is a fragmentary detail elevation of the same seen from the plane indicated by the line 9—9 of Fig. 8.

Fig. 10 is a fragmentary detail section on the line 10—10 of Fig. 1.

In said drawings, 1 indicates the engine-shaft or driving element which, in the instance illustrated, terminates in the coupling flange 2, suitably bolted to the head 3 of the fluid-pressure clutch casing. The said head 3 may very conveniently constitute the flywheel of the engine-shaft, as shown.

Integral with the head 3 and disposed eccentrically of the axis of the shaft 1, is a stud 4. Bolted or otherwise removably secured to the head 3 is the fluid-pressure clutch casing 5, the outer peripheral surface of which is cylindrical and concentric with the shaft 1. The bore of said casing 5 is, however, generally concentric with the stud 4. Said casing thus has a peripheral wall which presents a portion of greatest thickness diametrically opposite its portion of least thickness. In said thicker portion there is provided a bore parallel with the axis of said casing, wherein the oscillatory or rocking valve 6 is housed. Passages 7 and 8 extend from respectively opposite sides of said bore or said valve casing to establish communication with the interior of said casing 5 at two points, said passages 7 and 8 being of less width than and disposed midway of the ends of said casing so as to provide the arcuate surfaces 9 and 10 bordering said passages, said surfaces being coincident with the eccentric bore of said casing.

The end wall 11, integral with the peripheral wall of the casing 5, is provided with a bore of smaller diameter than the eccentric bore thereof and which is concentric with the shaft 1. This bore terminates at the annular shoulder 12. Rotatably mounted in said last-named bore is a plate 13 having an annular edge flange 14, the free edge of said flange abutting the shoulder 12. Suitably rigidly secured to the plate 13 is the end-wall 15 of a cylinder 16 which is open at its other end and which terminates in a flanged portion 17 which is rotatably disposed in an annular groove bearing in the head 3.

Said cylinder (Fig. 3) is provided with diametrically opposed radial slots, each bordered by parallel inwardly extending bearing flanges 18, said slots extending the full length between flange wall 17 and end wall 15 of said cylinder 16.

Mounted to extend diametrically of said cylinder and for reciprocation in said slots or guidance by said bearing flanges 18, is a piston element 19 recessed at its opposite ends for housing the packing elements 20 which are held by the compression springs 21, disposed in the longitudinal bores 22, normally in firm contact with the inner surface of the casing 5.

Said piston element 19 is provided midway between its ends, in one side-edge thereof, with a recess wherein the yoke element 23 is inserted, the latter being suitably rigidly secured to said piston element. Said yoke element 23 is provided with parallel end walls 25 extending perpendicularly to the diametric path of reciprocation of the piston element. Slidable in said yoke and rotatably mounted on the stud 4, is the sleeve 26 having parallel side faces slidably engaged with the parallel end walls of said yoke element.

The width of said piston element is the length of the casing 5 between the head 3 and the substantially crescent-shaped shoulder 27 opposed to and parallel with the same.

The inner face of the flange 14 of plate 13 is stepped to provide an internally threaded outer-end portion to receive the retaining ring 28 which is also keyed thereto by means of the driven key 29 and abuts against the annular shoulder 30. The latter is provided with a plurality of recesses 31 in which the peripheral projections or teeth 32 of the coupler-ring 33 engage for preventing rotation thereof relatively to the flange 14 of plate 13 while permitting limited movement axially thereof. The plate 13 is provided with a central stud 35 which engages freely in a bore in the end of the shaft 36 to which the motion and power of the shaft 1 are to be transmitted.

Associated with the driving coupler-ring 33 is the driven coupler-disc 34, disposed between the ring 33 and the plate 13. Centrally disposed on the driven disc 34 is the hub 38 having internal splines 37. Said end of the shaft 36 is provided externally with a plurality of longitudinal grooves in which the internal splines or ribs 37 of the hub 38 of the coupler-disc engage to prevent relative rotation of said disc and shaft, but permit slight relative longitudinal movement thereof.

Integral with the end-wall of the casing 5 is the bearing 39 for the shaft 36. At the outer end of said bearing is the packing gland 40. Slidable on said bearing 39 between said gland 40 and the casing end is a sleeve 41 which is non-rotatable relatively to said bearing and is provided with an annular groove in which the annular flange 43 of the collar 44 engages, the latter being equipped with the trunnions 45 for engagement with an operating lever.

Between said end wall of the casing and the coupler-disc 34 there is a slidably mounted for longitudinal movement on the hub 38 of the latter, an annularly grooved sleeve 46 which is normally pressed away from the coupler disc 34 by the spiro-helical flat spring 47 which also bears upon the retaining ring 28. The latter is provided with a plurality of slots 48 bordered by bracket bosses 49 between and on which the cam levers 50 are pivotally mounted, the free ends of the long arms of said levers being engaged in the annular groove of the collar 46. The short or cam ends of said levers engage in cam recess 51 in the coupler-ring 33, the said recess and cam ends of said levers being relatively arranged to cause the ring 33 to be forced into firm engagement with the coupler-disc 34 as the collar 46 is moved substantially to the position shown in Fig. 1 by the spring 47 and to permit complete dissociation of said coupler-members as said collar 46 is moved against the action of said spring.

The opposed faces of said coupler-elements 33 and 34 are radially serrated by means of relatively wide but very shallow projections 52 which, while permitting a rigid association of said elements, will also act cam-like to effect complete dissociation when relieved of the associating pressure. The depth of the radial recesses or grooves is necessarily slightly less than the width of the free space between the retaining ring 28 and the ring 33 when engaged as shown in Fig. 1. This tendency to separate obviates the necessity of providing means to effect a separation of the coupler-elements.

The foregoing arrangement obviously eliminates all thrust pressure tending to effect relative axial movement of the casing 5 and the cylinder 16, because the plate 13 is rigid with the retaining ring and, therefore, with the pivots of the cam-levers, the coupling-pressure being thus directed to exert a separating force against said plate 13 and ring 33.

Mounted in the end wall of the casing 5 around the bearing 39, are longitudinally reciprocable plungers 53, the stems 54 of which extend through the stuffing boxes 55 into the path of the sleeve 41, so that as said sleeve is moved toward said end-wall of said casing 5, the said plungers will be caused to move the collar 46 in the same direction to thereby turn the cam-levers 50 in a direction to permit the clutch-elements to become disengaged from each other. The outer ends of said stems 54 are normally spaced from the opposed end of the sleeve 41, for reasons hereinafter explained.

Mounted upon one end of the valve 6 is a segmental mitre-gear pinion 56 which meshes with a similar pinion 57 on the radially disposed rock-shaft 58 journalled between its ends in a stuffing-box bearing 59 which is in part integral with the casing 5. Said shaft is equipped at its inner end with a crank 60, the crank-pin 61 of which pivotally engages the link 62 pivotally mounted on the sleeve 41, so that as said sleeve is reciprocated, said shaft 58 will be rocked to thereby turn said valve 6, said crank-pin being moved out of engaging relation to the nearest stem 54 as said sleeve is moved toward the same.

Preferably the cylinder 16, the space around the same in which the outer ends of the piston element travel, and the chamber containing the coupler-elements 33 and 34 are all maintained full of lubricating oil of a suitable grade or grades. The oil filling the cylinder 16 and the coupler-disc chamber is received from the force-feed lubricating system, common to the power plants of all automotive vehicles, through the duct 63 in the shaft 1 and head 3, and the check-valves 64 disposed at the delivery end of said duct in the hollow of the stud 4, said cylinder 16 communicating with the coupler-disc chamber through one or more openings 65. The space surrounding the cylinder 16 is filled through the plugged opening 66.

It will be observed particularly that the circumferential surface of the cylinder 16 rotates in snug contact with the (inner) bridge-wall of the chamber for the valve 6 at the point diametrically aligned with the axis of said valve. At each side of this point of contact the opposed peripheral walls converge to form almost imperceptible wedge-shaped chambers in one of which oil is trapped as the piston packings enter said chamber. In practice it was found that this trapping of oil created such resistance to the rotation of the cylinder as to produce a very perceptible jar and slowing up of said cylinder at each half-revolution thereof relatively to the casing. A vital feature of the present invention resides in providing the pressure-relief openings 67 in the bridge-wall contiguous to the valve 6.

While the bore of the casing 5 has been referred to as being generally concentric with the stud (or crank-pin) 4, it is actually an ellipse, being of greatest diameter on a horizontal line through the center of cylinder 16, as seen in Fig. 3. However, this departure from a true cylinder is so negligible as to be of no special importance and is practically impossible of illustration in the drawings. Cylinder 16 is concentric with engine-shaft 1 and carries piston-bar 19, and as piston-bar 19 assumes the horizontal below the center of casing bore 5, the diameter of bore in casing 5 must be increased on this line to enable the piston-bar 19 to pass.

The operation of the device is as follows:

The sleeve 41 and collar 44 are adapted for association with the ordinary clutch-lever of an automotive vehicle, which is normally spring-held to maintain the coupler-elements engaged with each other, release of the latter being effected by moving the said clutch-lever against the action of its spring and of the spring 47. Said sleeve 41 is shown in Fig. 1 in the position it occupies when the said clutch lever is in normal spring-held position.

In this position of the clutch-lever the coupler-elements 33 and 34 are firmly engaged with each other and the valve 6 is closed so that circulation of fluid in the casing 5 is prevented. Consequently, the cylinder 16 and piston-element 19 are held against rotation relatively to the casing 5 and thus the shafts 1 and 36 are caused to rotate in unison.

As the said clutch-lever of the vehicle is actuated against its spring, the sleeve 41 will move toward the stems 54 of the plungers 53 and, prior to engagement with the latter, will have opened the valve 6 sufficiently to permit relatively free circulation of fluid therethrough, to thus permit substantially unrestricted relative rotation of the cylinder 16 within the casing 5.

Further movement of the sleeve 41 will cause the plungers 53 to move the sleeve 46 against the action of the spring 47 to thereby turn the cam-levers 50 to a position permitting the coupler-elements 33 and 34 to become entirely disengaged. This permits the cylinder 16 to become disengaged from shaft 36 and to rotate in unison with the casing 5 and bearing 39, said bearing now rotating about the shaft 36. The frictional resistance to this relative rotation is so slight as to be wholly incomparable with that due to clutch-drag.

As the clutch-lever of the vehicle is released, the initial reverse movement of the sleeve 41 causes the plungers 53 and sleeve 46 to be returned to the positions shown in Fig. 1, while the valve 6 is still sufficiently wide open to permit the cylinder 16 to rotate freely relatively to the casing 5 (or vice versa), the coupler elements 33 and 34 being thus engaged with each other before the closure of the valve 6 has attained the point where the resistance to relative rotation of cylinder 16 and casing 5 is appreciable. Further outward movement of the sleeve 41 will, however, gradually close the valve 6 and thus throw in such resistance.

The coupler-elements 33 and 34 are thus firmly engaged before there is an appreciable load on either thereof, thus permitting the positive type of clutch exemplified by said elements, to be employed.

It will be appreciated, of course, that other coupling means adapted to the purpose, may be substituted for the coupler elements shown, without departure from the invention as defined in the appended claims.

Obviously, if the coupler device described herein, together with the plungers 53—54 are omitted, the structure would constitute the exact equivalent (except as hereinbefore particularly pointed out with regard to improvements in the fluid-pressure clutch per se) of that illustrated and described in my aforesaid allowed application for patent, Serial No. 346,561, filed Dec. 18, 1919, wherein the driven shaft, corresponding to shaft 36, is rigid with the piston carrier corresponding to the cylinder 16 and associated parts. It would be preferable, of course, if it were desired to effect direct connection between the shaft 36 and said cylinder 16, to entirely omit the said coupler-elements 33 and 34 and effect direct coupling of the shaft 36 with the end-wall 15 of said cylinder 16. This modification is so obvious that it would not seem to require particular illustration and, therefore, the latter is omitted.

As soon as the coupler elements 33 and 34 are fully engaged with each other and the valve 6 has attained substantially fully closed position, the rotor 16 will, except for possible leakage past the valve 6, be rotating at the same speed as the casing 5, or, in other words, the shafts 1 and 36 will or should be rotating in unison. To prevent possible loss of speed of shaft 1 and of power due to such leakage, and, further, to relieve of pressure the liquid or fluid trapped between a piston element and the valve, I have provided simple and efficient means for automatically locking the rotor and casing against relative rotation, said means being illustrated in Figs. 1, 8, 8ª and 9.

In the peripheries of the end wall 11 and plate 13, I provide registering recesses 69. In a recess in the peripheral wall of the casing and at one side of the passage controlled by the valve 6, I insert an arcuate plate 70 equipped with an opening for the passage of the stem portion of the valve 6, said plate being bifurcated at one end as shown in Fig. 9, to provide a slot to receive the pivoted shank 71 of lock element 72 adapted to engage in recess 69. The valve 6 is provided with substantially diametrically opposed arcuate cam-grooves 73 and 74. The locking element 72 is provided with a projection or surface formation 75 for engaging in the groove 73 and the shank 71 is provided with a projection 76 opposing said formation 75 and engaging in the groove 74, the arrangement being such that when the valve 6 is open or partially open, the projection 76 is disposed out of the groove 74, and the formation 75 is disposed in the groove 73, said grooves 73 and 74 being of such relative arcuate extent and position that as said valve 6 attains initial closed position the cam groove 74 becomes opposed to the projection 76 and the formation 75 becomes opposed to the periphery of the valve 6 between the cam grooves just as the projection 76 enters the groove 74. This initial movement is positive and will arrest rotation of the valve 6 until recess 69 of the rotor is opposed to the head 72. While the rotation of the valve 6 is thus arrested, some leakage past the valve will occur to permit a slight and slow relative rotation of rotor and casing, until recess 69 is opposed to the head 72, whereupon the locking element moves suddenly into engagement with the rotor and locks the same against rotation with respect to the casing at the same instant that the valve 6 moves to fully closed position.

Vice versa, when the formation 75 is disposed in the groove 73, the projection 76 rides upon the periphery of the valve 6 and thus supports the head 72 in the position shown in Fig. 8.

Attention is directed to the fact that the foregoing operation is accomplished by the clutch-lever of the vehicle which is spring-actuated in the direction of its movement to accomplish the foregoing operation, so that the arrest of movement of the valve 6 merely serves to arrest that of the clutch-lever until recess 69 is opposed to the head 72, the valve 6 being thus subject to the yielding pressure of the clutch-lever spring.

I claim as my invention:

1. In a power transmission means, a fluid pressure controlled device interposed between a driving element and an element to be driven and including two relatively rotatable members arranged to effect forced travel of a fluid upon relative rotation, a passage for the fluid, a manually operable valve controlling said passage for regulating the resistant force of said fluid to relative rotation of said members, and mechanical locking means including a recess in one of said members and a device on the other thereof for engaging in said recess for locking said members against relative rotation, a cam element associated with said valve, and means on said device operatively engaged with said cam element for automatically throwing said device into and out of engaging relation to said recess as said valve is closed and opened, respectively.

2. A power transmission means including a driving and a driven element, a valve controlled fluid pressure clutch interposed between said elements, means for completely dissociating said clutch from and positively associating the same with one of said elements, and means for converting said fluid pressure clutch into a positive clutch locking said elements against relative rotation, said last-named means associated with said dissociating means for causing said valve to be substantially fully opened before dissociation of said clutch with one of said elements is effected.

3. A power transmission means including a driving and a driven element, a valve controlled fluid pressure clutch interposed between said elements, means for completely dissociating said clutch from and positively associating the same with one of said elements, and means for converting said fluid pressure clutch into a positive clutch locking said elements against relative rotation as the fluid pressure in said clutch attains its substantially maximum degree of resistant force, said last-named means associated with said dissociating means for causing said valve to be substantially fully opened before dissociation of said clutch with one of said elements is effected.

4. A power transmission means including a driving and a driven element, a valve controlled fluid pressure clutch interposed between said elements, means for completely dissociating said clutch from and positively associating the same with one of said elements, and means for automatically converting said fluid pressure clutch into a positive clutch locking said elements against relative rotation, said last-named means associated with said dissociating means for causing said valve to be substantially fully opened before dissociation of said clutch with one of said elements is effected.

5. A power transmission means including a driving and a driven element, a valve controlled fluid pressure clutch interposed between said elements, means for completely dissociating said clutch from and positively associating the same with one of said elements, and means for automatically converting said fluid pressure clutch into a positive clutch locking said elements against relative rotation as the fluid pressure in said clutch attains its substantially maximum degree of resistant force, said last-named means associated with said dissociating means for causing said valve to be substantially fully opened before dissociation of said clutch with one of said elements is effected.

6. A power transmission means including a valve-controlled fluid pressure clutch normally operatively associated with a driving and a driven element, a self-releasing mechanical clutch operatively interposed between said fluid pressure clutch and one of said elements, a manually operable device associated with the valve controlling said fluid pressure clutch and said mechanical clutch for actuating the latter and said valve in a predetermined order of succession, and means included in said fluid pressure clutch for automatically locking the same against lost motion as said valve attains closed position.

7. A power transmitting means including a fluid pressure clutch interposed between a driving and a driven element and having a member permanently rigid with one of said elements, a self-releasing mechanical clutch member rigidly associated with the other clutch element, a companion mechanical clutch member non-rotatably associated with the other of said elements, a valve controlling said fluid pressure clutch, a locking device associated with the members of the latter and said valve for automatically locking the same against rotation as said valve attains closed position, and a manually operable member associated with said mechanical clutch and said valve for interengaging said mechanical clutch members before moving said valve toward closed position and vice versa.

8. A power transmission means including a fluid pressure clutch including two relatively rotatable cylindrical elements disposed eccentrically to each other, one thereof equipped with radially disposed reciprocable piston members for spanning free space between said elements, a passage in the outer element for travel of trapped fluid actuated by said piston members, a rotary valve controlling said passage, a peripheral recess in the inner element, a latch member pivotally mounted in the peripheral wall of the outer element, and formations on a part of said valve engaged with said latch element for throwing the latter into engaging relation to said recess as said valve is closed, to thereby lock said elements against relative rotation.

9. In a power transmission device, including a hydraulic clutch having two relatively rotatable members, one thereof associated with a drive shaft and the other with a shaft to be driven, of a pair of opposed clutch elements, one thereof slidable on and non-rotatable relatively to the shaft to be driven and the other thereof non-rotatable relatively to one of the said members, the opposed faces of said elements equipped with shallow and wide formations simulating radial corrugations adapted to be interengaged under the influence of pressure exerted and maintained thereon, a plate rigid with the member associated with the shaft to be driven, a plurality of bell-crank levers pivotally mounted in said plate and bearing at one end on one of said clutch elements, an annularly grooved collar slidable on the clutch element connected with the shaft to be driven and engaged with the other ends of said bell-crank levers, a spring bearing on said collar to maintain the same normally positioned to hold said clutch elements firmly engaged with each other, said elements adapted to automatically move out of engaging relation to each other as said collar is moved against the action of said spring.

In testimony whereof, I have hereunto set my hand this 26th day of November, 1924.

CARLYLE B. FUNK.